United States Patent [19]
Godfrey

[11] 3,716,015
[45] Feb. 13, 1973

[54] MEASURING DEVICES

[75] Inventor: Peter James Godfrey, Bradford, England

[73] Assignee: Fratelli Rotondi Di E' Rotondi & C.S.A.S., Milan, Italy

[22] Filed: Nov. 12, 1970

[21] Appl. No.: 88,536

[30] Foreign Application Priority Data

May 29, 1970 Great Britain.................25901/70

[52] U.S. Cl. ..................116/115.5, 33/166, 116/115, 116/133, 235/78, 235/88
[51] Int. Cl. ..........................................B23q 17/00
[58] Field of Search...116/124, 129, 115, 115.5, 133; 33/166, 1 SD; 235/78, 88

[56] References Cited

UNITED STATES PATENTS 1,027,549  5/1912  Kronert ..................116/129 UX

Primary Examiner—Louis J. Capozi
Attorney—Wenderoth, Lind & Ponack

[57] ABSTRACT

A measuring device adapted to indicate a measurement value in two different scales, e.g. a metric length scale and a British length scale, said device comprising two elements relatively movable, each of which carries a scale and a datum mark for the scale of the other element, in order to indicate therein a measurement value corresponding to a relative shifting motion of said elements, said scales extending in opposite directions to each other at the adjacent surfaces of said elements.

9 Claims, 2 Drawing Figures

PATENTED FEB 13 1973

3,716,015

PETER J. GODFREY, INVENTOR.

By Wenderoth, Lind & Ponack
Attorneys

MEASURING DEVICES

BACKGROUND

This invention relates to measuring devices of the type comprising two relatively movable elements, one of which has or carries a scale and other a datum mark for said scale, said datum mark indicating a measurement value on said scale which corresponds to a relative movement of said elements.

Said measuring devices are broadly used especially in length measurement for controlling machining operations and the like, and their use often involves the necessity or convenience of having two measuring values in different units and both corresponding to a relative shifting motion of said elements.

SUMMARY

Accordingly, this invention provides a measuring device comprising two relatively movable elements one of which has or carries a scale and the other has or carries a datum mark for said scale, in order to indicate a measurement value thereon corresponding to a relative shifting motion of said elements, said other element having or carrying a second scale to indicate in different units a measurement value thereon corresponding to a relative shifting motion of said elements, said second scale extending in a direction opposite to that of said first scale and said one element carrying a datum mark for said second scale.

In a preferred embodiment of the measuring device according to this invention, said scales and said datum marks are at the adjacent edge regions of said elements. Said datum marks can be in the form of vernier scales and said scales may be a metric length scale and a British length scale, respectively.

DRAWINGS

PREFERRED EMBODIMENT

Figure 1:
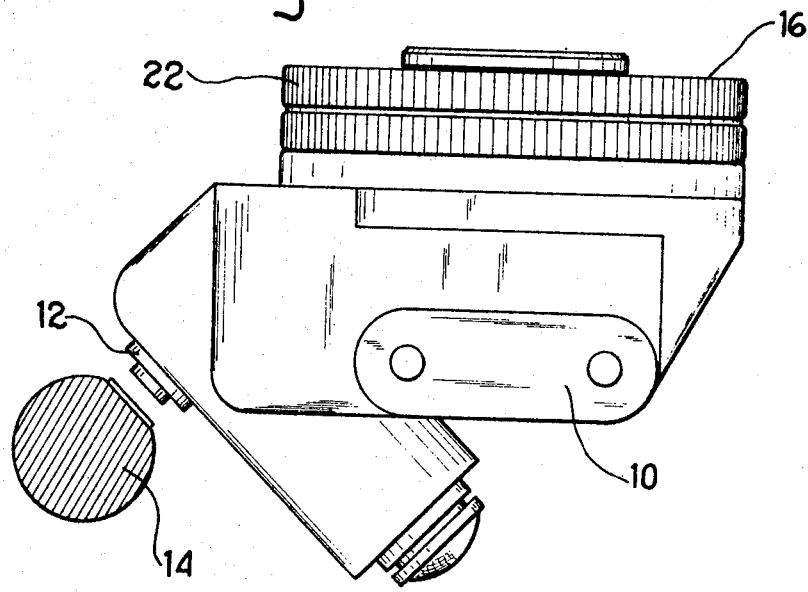
FIG. 1 is a side view of an optical measuring device in operative position.

Referring to the drawings, an optical measuring device or position indicator is shown of the type comprising a display window in which is displayed a region of a "viewed" scale when the device is operatively positioned with its viewing aperture or sensing "eye" adjacent the scale. The optics contained within the device ensure that the region of the scale viewed is displayed in the said window. Surrounding the display window is a rotatable wheel having scale markings thereon, the arrangement being that the markings correspond to a sub-division of the smallest step in the scale being viewed. By rotating the rotary wheel a register mark is caused to move across the screen by a distance representing the amount of the wheel scale which passes a fixed datum mark.

Optical measuring devices of the type aforesaid are very accurate although they are basically simple in construction. They are used mainly in machine tool applications where the position of a movable machine tool part, such as a workpiece table, has to be accurately ascertained. The viewed scale is usually engraved or photographed on to a highly reflective metal bar which is attached to the movable part of the machine, whereas the device is mounted in a stationary part of the machine, with its viewing aperture in register with the scale on the bar.

More detailedly, with reference to FIG. 1, the device is shown to comprise a casing 10 with a viewing "eye" 12 positioned adjacent a scale bar 14 which is attached to the desired movable machine tool part. At the upper surface 16 is a viewing window 18 shown clearly in FIG. 2. Window 18 is surrounded by two annular wheels 20, 22 disposed one within the other. The outer wheel 22 is manually rotatable and is provided with a Metric length scale as shown at its inner peripheral region, whilst the inner wheel 20, which is stationary, is provided with a British length scale at its outer peripheral region, the two scales preferably being marked in different colors for easy reference. Each wheel 20,22 is provided with a datum mark for the scale on the other wheel 20,22 to provide an initial setting position and the scales have vernier graduations for accurate positioning of the wheel 22.

Figure 2:
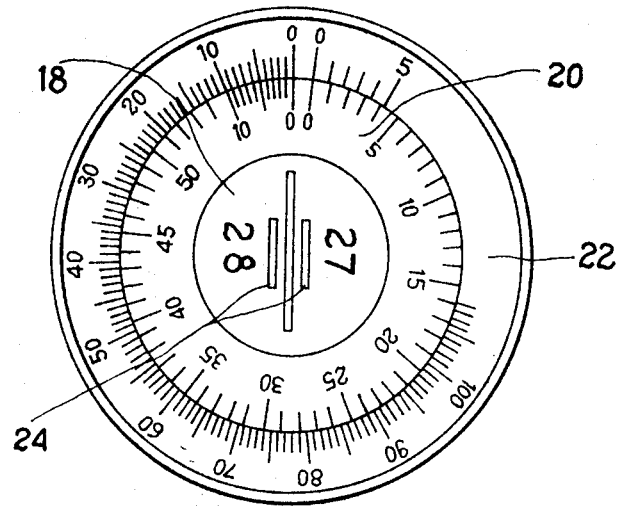
Fig. 2 is a partial face view of the measuring device of FIG. 1.

A register mark which moves across the window upon turning of the wheel 22 consists of a pair of spaced, parallel lines 24 which are positioned to either side of a line of the bar scale displayed in the window as shown in FIG. 2. There is a cam drive between the wheel 22 and a transparent plate carrying lines 24 to ensure linear movement of the lines 24 which is proportional to the angular movement of wheel 22. Similar devices employing such register marks are well-known and widely used.

In using the device, the rotary scale is set by turning the wheel 22, so that its zero registers with the datum mark on the stationary wheel 20 of the device and the machine movable part is set to some datum position. If it is now desired to move the machine movable part by a preset number of whole divisions plus a fraction of a division, the movable part of the machine is moved, through the whole number of divisions, this being checked by the operator by viewing the window 18.

Next, the rotary wheel 22 is rotated through a distance to represent the fraction of the division, which causes the register mark 24 to move across the screen 18. Finally, the machine movable part is moved by the operator until the scale mark displayed in the window 18 is in register with the register mark 24 and the movable machine part is now accurately positioned in the desired position.

As a scale is provided on the inner wheel 20 and a scale in different units is provided on the outer wheel 22, the device can be used in positioning in two different measuring systems, i.e., Metric and British systems.

The device is used with the reflective bar 14 having two different scales of measurement. The divisions in each of these scales are preferably numbered for easy reading and adjustment when the bar has to be moved through a whole number of divisions before the device of the invention is brought into operation.

In use, the device is preferably mounted so that it can easily be moved from reading one scale on the bar to reading the other scale on the bar. This may be achieved by any suitable two position lever mechanism (not Shown), which may be hand operated and provides for the positioning of the device transversely of the bar scales to enable the device to view either the British or the Metric length scale on the bar.

In the example, the metric scale is in 100 divisions, each representing 0.01 of a millimeter whilst the British scale is in 50 divisions each representing one-thousandth of an inch. The two scales on the bar 14 therefore should be divisions of one millimeter for the Metric scale and divisions of 50 thousandths of an inch for the British scale.

Although a preferred embodiment of this invention has been described with reference to the accompanying drawings, it is to be understood that said double scale measuring device can be utilized in connection with many other measuring instruments, for instance with instruments having two elements relatively movable in a rectilinear direction.

By the invention, it will be appreciated that the single measuring device of the type aforesaid capable of operating on a British system or a Metric system has been provided and should prove very valuable to manufacturers of components in British and Metric sizes.

I claim:

1. A measuring device comprising two relatively movable elements, one of which has or carries a first calibrated scale and the other of which has or carries a datum mark for said first scale, said datum mark indicating a measurement value on said first scale corresponding to a relative shifting motion of said elements, said other element having or carrying a second scale calibrated in units different from the units of said first scale and extending in a direction opposite to that of said first scale, said one element further carrying a datum mark for said second scale which indicates on said second scale in different units a measurement value corresponding to the relative shifting motion of said elements.

2. A measuring device according to claim 1, wherein said scales and said datum marks are at the adjacent edge regions of said elements.

3. A measuring device according to claim 1, wherein at least one of said datum marks is in the form of a vernier scale.

4. A measuring device according to claim 1 wherein said first scale is a Metric length scale and said second scale is a second scale is a British length scale.

5. A measuring device according to claim 1 wherein each of said datum marks is in the form of a vernier scale.

6. A measuring device according to claim 1, wherein said elements are in the form of co-axially arranged wheels, respectively a rotary scale wheel and a stationary scale wheel, one of which surrounds the other.

7. A measuring device according to claim 6 in combination with a longitudinal bar which is relatively movable with reference to said scale wheels and has or carries two parallel scales respectively in units corresponding to said units of said rotary and stationary wheels, or multiple of said units, said rotary scale wheel being arranged to control the movement of a register mark across a screen wherein a region of said longitudinal bar is displayed.

8. A measuring device according to claim 7 wherein said device is mounted on a machine tool and wherein said longitudinal bar is attached to a longitudinally movable part of said machine tool and said rotary and stationary wheels and screen are mounted on a stationary part of said machine tool.

9. A measuring device according to claim 7 wherein said rotary and stationary scale wheels and screen are mounted on a frame and said frame comprises two position lever means for moving the same transversally to said longitudinal bar, in order to respectively display on said screen one scale or the other scale of said parallel scales on the bar.

* * * * *